(12) United States Patent
Cotis

(10) Patent No.: US 6,388,642 B1
(45) Date of Patent: May 14, 2002

(54) BIDIRECTIONAL MULTISPEED INDEXING CONTROL SYSTEM

(75) Inventor: Joseph F. Cotis, Scotch Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/528,561

(22) Filed: Mar. 20, 2000

(51) Int. Cl.[7] .................................................. G09G 3/04
(52) U.S. Cl. .............................. 345/33; 345/34; 345/46; 368/30; 368/82; 368/83; 368/84; 368/241; 368/242
(58) Field of Search .............................. 345/33, 34, 46; 368/30, 82, 83, 84, 241, 242

(56) References Cited

U.S. PATENT DOCUMENTS 4,250,572 A * 2/1981 Yoshida ........................ 368/71
5,757,731 A * 5/1998 Rosenberg ................... 368/242
5,917,779 A * 6/1999 Ralson et al. .................. 368/83

* cited by examiner

*Primary Examiner*—Richard Hjerpe
*Assistant Examiner*—Jean Lesperance
(74) *Attorney, Agent, or Firm*—David L. Davis

(57) ABSTRACT

A bidirectional multispeed indexing control system for a display unit which has an increment input and a decrement input so as to be controllable to sequentially index through an ordered list of discrete elements. The control system has a two-button user interface. The user presses one button to increment once, and holds that button to continuously index at a slow fixed speed. To increase the indexing speed, the user presses the second button while continuing to hold the first button. Indexing speed will continue to increase until either a maximum speed is reached or the user releases the second button, at which point the indexing speed decreases from the value reached while holding the second button. To stop indexing, both buttons are released. To increment in the opposite direction (i.e., decrement), the order in which the buttons are pressed is reversed.

14 Claims, 4 Drawing Sheets

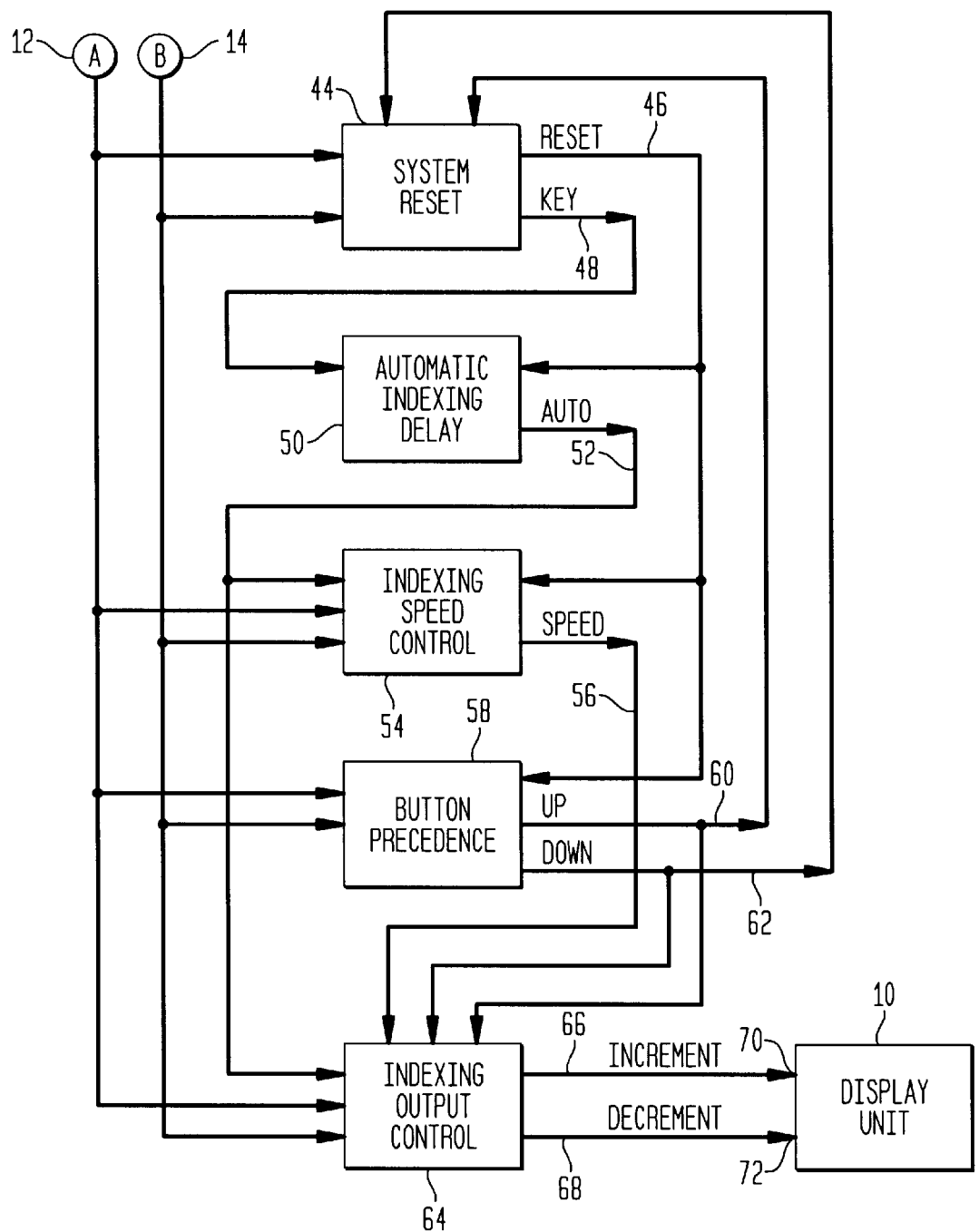

BIDIRECTIONAL MULTISPEED INDEXING CONTROL SYSTEM

BACKGROUND OF THE INVENTION

This invention relates to a display unit which has an increment input and a decrement input so as to be controllable to sequentially index through an ordered list of discrete elements and, more particularly, to a control system which provides bidirectional multispeed indexing control of the display unit.

There are numerous display units which require that the user control the display unit to sequentially index through an ordered list of discrete elements. A digital clock is one such type of display unit which requires this type of indexing in order to change the time and/or alarm setting. Another such type of display unit is associated with a computer where the user has to scroll through a list. It would be desirable to have a control system wherein the indexing is controllable to be bidirectional and it would be further desirable to have such a control system wherein the user can control the indexing speed.

SUMMARY OF THE INVENTION

According to the present invention, there is provided a bidirectional multispeed indexing control system for a display unit which has an increment input and a decrement input so as to be controllable to sequentially index through an ordered list of discrete elements. The inventive control system includes a first operator actuatable switch, a second operator actuatable switch, and a display control unit. The display unit is responsive to operator actuation of the first and second switches and is effective to provide signals to the increment and decrement inputs of the display unit so as to control the display unit to index through the ordered list in a respective direction according to which of the first and second switches is actuated first. The display control unit is further effective to provide the signals to the increment and decrement inputs of the display unit at a speed which is determined by whether the other of the first and second switches is also actuated.

In accordance with an aspect of this invention, the display control unit is responsive to continued actuation of the other of the first and second switches to increase the indexing speed of the display unit.

In accordance with another aspect of this invention, the display control unit is responsive to subsequent deactuation of the other of the first and second switches to decrease the indexing speed of the display unit.

BRIEF DESCRIPTION OF THE DRAWINGS

The foregoing will be more readily apparent upon reading the following description in conjunction with the drawings in which like elements in different figures thereof are identified by the same reference numeral and wherein:

FIG. 3 is a block diagram of an illustrative control system constructed according to the present invention.

DETAILED DESCRIPTION

Figure 1:
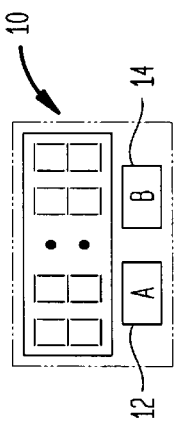
FIG. 1 shows an illustrative display unit of the type which is controllable by a system constructed in accordance with the present invention.
Figure 4A:
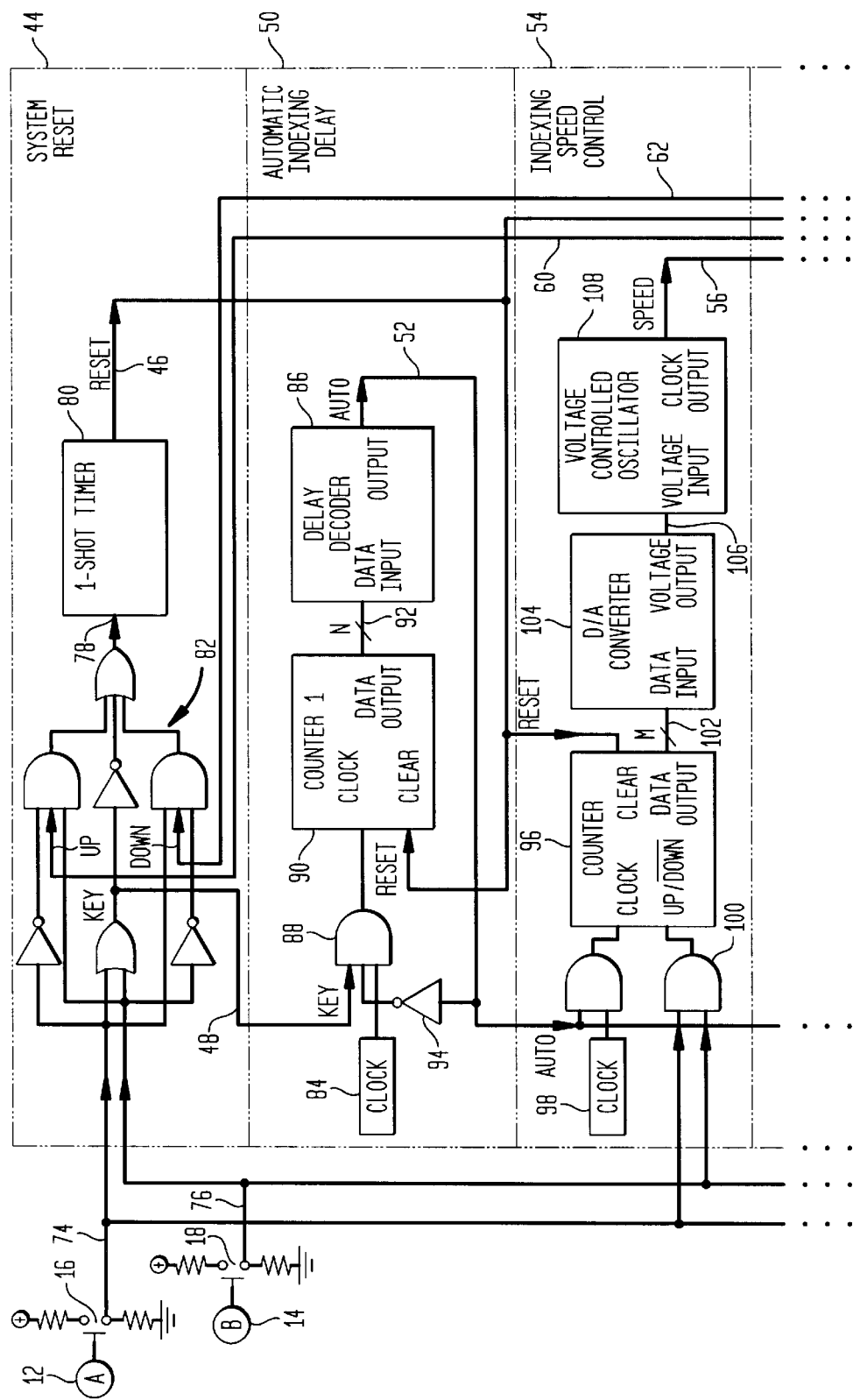
FIGS. 4A and 4B, with FIG. 4A placed above FIG. 4B, together show a schematic diagram of illustrative circuitry implementing the block diagram of FIG. 3.

Referring now to the drawings, FIG. 1 shows an illustrative display unit 10 with which the present invention finds utility. As shown, the illustrative display unit 10 is a digital clock having four seven-segment numerals. Two operator actuatable buttons 12, 14 (also labeled A and B) are provided for controlling the setting of the display unit 10. Each of the buttons 12, 14 is associated with a respective underlying normally open momentary contact switch 16, 18 (FIG. 4A). According to the present invention, if the user presses and then releases button 12, the display unit 10 will increment once. If the user presses and releases button 14, the display unit 10 will decrement once. If the user presses and continues to hold one of the buttons 12, 14, the display unit 10 will either increment or decrement, respectively, at a slow fixed speed. To increase the indexing speed, the user presses the second button while continuing to hold the first button. The indexing speed will then continue to increase until either a maximum speed is reached or the user releases the second button, at which point the indexing speed decreases from the value reached while holding the second button. To stop indexing, both buttons are released. To index in the opposite direction, the order in which the buttons are pressed is reversed.

Figure 2:
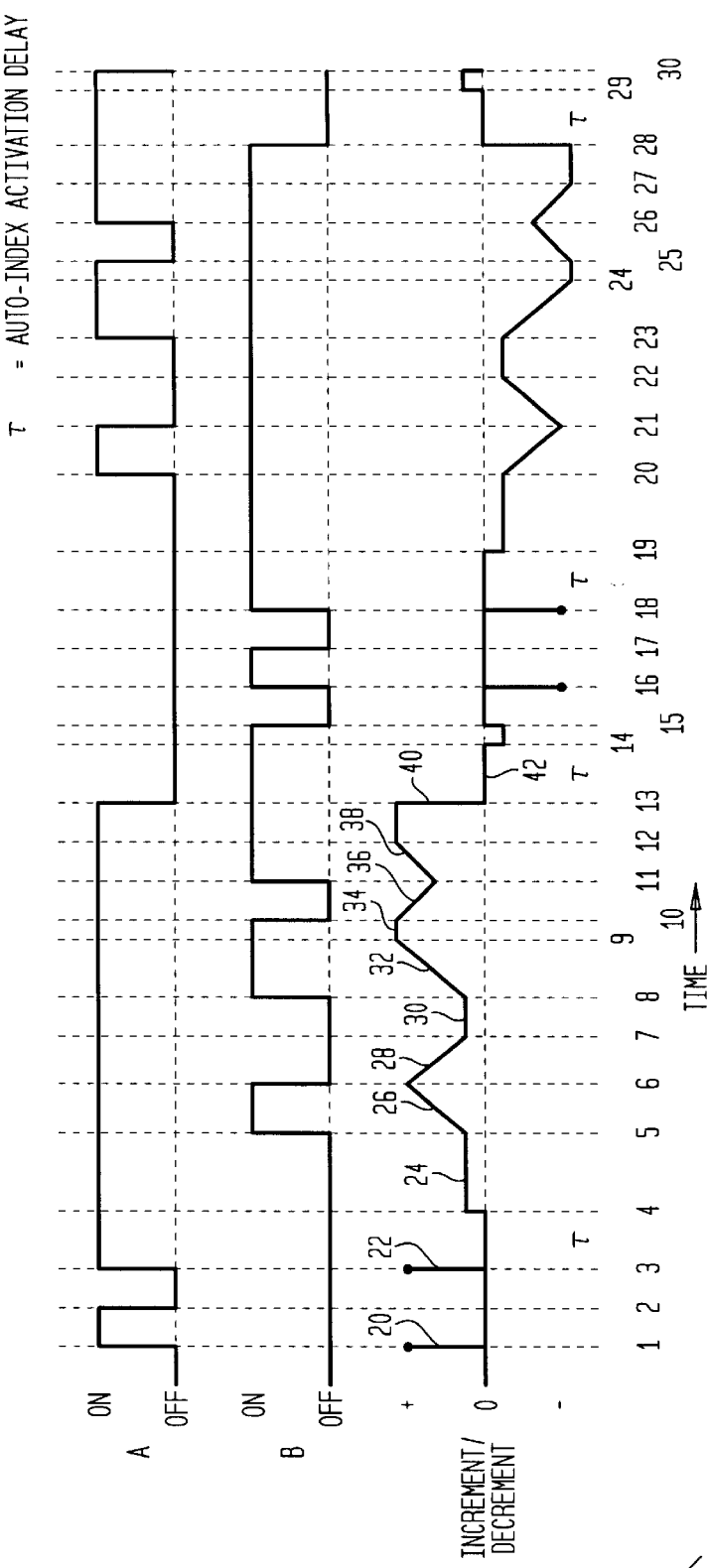
FIG. 2 shows timing charts useful in understanding the present invention.

FIG. 2 shows an illustrative sequence of actuations of the buttons 12, 14 (A, B) and the resulting bidirectional multispeed indexing of the display unit 10, according to the present invention. As shown, the button 12 is pressed at time 1 and released at time 2. Depression of the button 12 at time 1 results in a single increment of the display unit 10, as indicated at 20. The button 12 is then depressed again at time 3 and held until time 13. The pressing of the button 12 at time 3 results in another single increment of the display 10, as indicated at 22. The continued holding of the button 12 longer than an auto-index activation delay τ until time 4 causes a fixed speed indexing to occur, as indicated at 24. At time 5, the button 14 is also pressed and held until time 6. This results in an increasing of the rate of incrementing the display unit 10, as indicated at 26. The button 14 is released at time 6 until time 8, so during this time, the rate of incrementing the display unit 10 decreases down to the fixed speed, as indicated at 28 and 30. At time 8, the button 14 is pressed again, causing the rate of incrementing the display unit 10 to increase, as indicated at 32. This increase continues until some maximum speed is reached, as indicated at 34, at time 9. At time 10, the button 14 is released so the rate of incrementing the display unit 10 decreases, as indicated at 36. At time 11, the button 14 is pressed, so the rate of incrementing the display unit 10 increases, as indicated at 38. At time 12, the maximum rate of incrementing is reached, as indicated at 40. At time 13, the button 12 is released, while the button 14 continues to be pressed. This results in a cessation of the indexing of the display unit 10, as indicated at 42. If the button 14 continues to be pressed after the button 12 is released, indexing in the opposite direction will begin after a delay of τ, beginning at time 14. Reverse indexing follows the same scheme as described above, with the exception that the functions of the buttons 12 and 14 are interchanged.

FIG. 3 is a block diagram of an illustrative control system for generating increment and decrement signals for the display 10 in response to operator actuation of the buttons 12, 14. The system reset circuit 44 generates an internal RESET signal on the lead 46 that forces the system into an initial standby state in which the system outputs are inactive, and user input will initiate indexing in either the forward or reverse direction. The circuit 44 also generates an internal KEY signal on the lead 48 which indicates that one or both of the input buttons 12, 14 has been pressed. The automatic indexing delay circuit 50 generates an AUTO signal on the lead 52 whenever either of the buttons 12, 14 have been pressed for a certain period of time, this period of time being designated by the symbol τ in the foregoing description of FIG. 2. This period τ is the automatic indexing activation delay, which is the period the user must press a button before indexing will occur automatically and at a fixed speed. The absolute period τ can be chosen to be just long enough to insure that the user intentionally pressed the button to initiate the automatic indexing. The indexing speed control circuit 54 produces the SPEED signal on the lead 56, which is a variable frequency clock signal that establishes the indexing speed.

The button precedence circuit 58 determines which of the buttons 12, 14 was pressed first after the most recent RESET pulse on the lead 46. This determines in which direction the indexing activity will proceed. The UP output on the lead 60 indicates that the indexing should be incrementing and the DOWN signal on the lead 62 indicates that the indexing should be decrementing. The indexing output control circuit 64 provides inputs to the display unit 10 on either the INCREMENT lead 66 or the DECREMENT lead 68 to the corresponding increment and decrement inputs 70, 72 of the display unit 10.

Figure 4B:
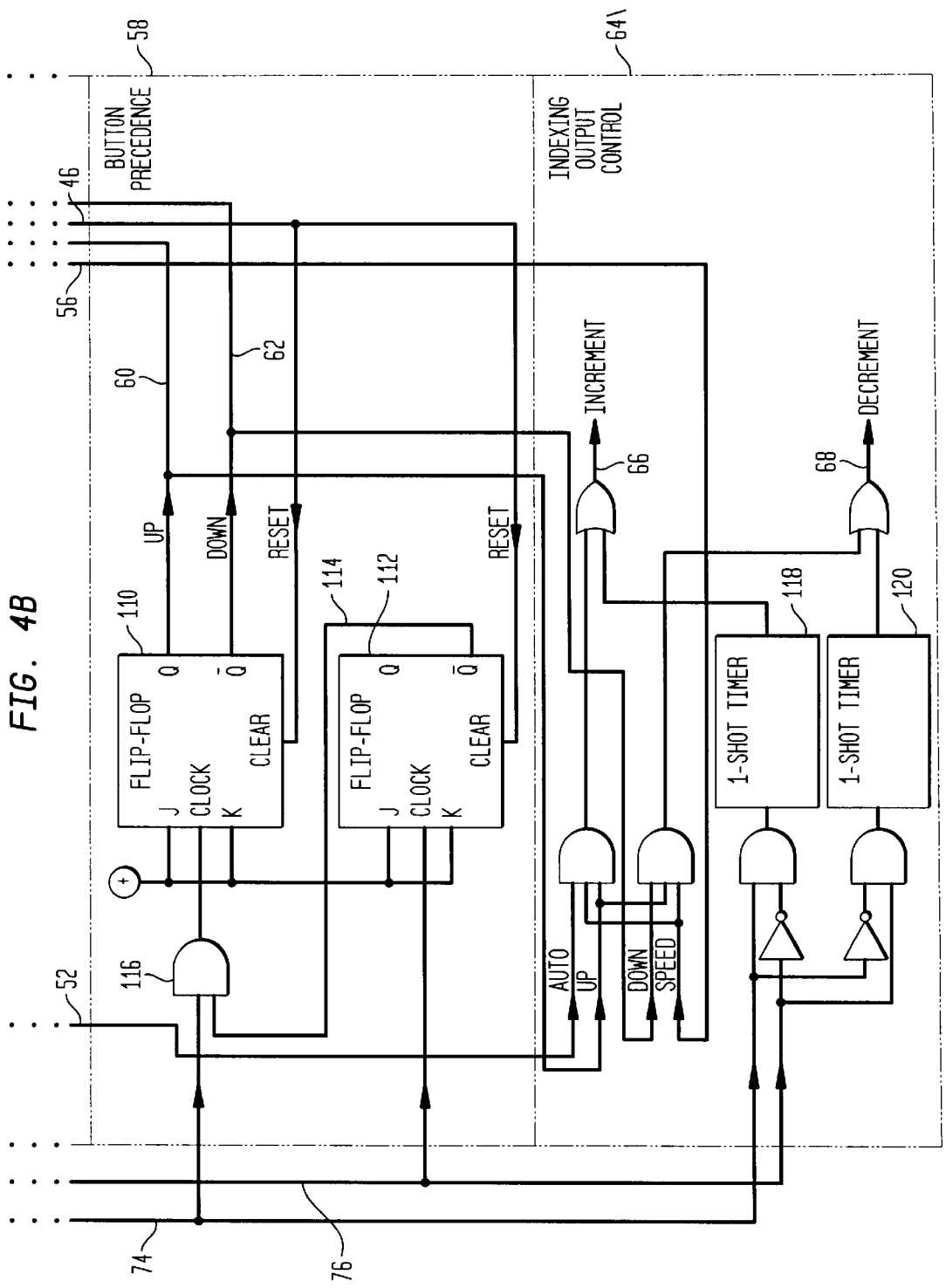

Referring now to FIGS. 4A and 4B, all logic signals used in the illustrative system are active high (logic level 1) and inactive low (logic level 0). The system has two external inputs which are generated when the buttons 12, 14 are pressed to close the respective switches 16, 18. Thus, when the button 12 is pressed, a logic level 1 signal is placed on the lead 74 and when the button 12 is released, the signal on the lead 74 becomes a logic level 0. Similarly, when the button 14 is pressed, a logic level 1 signal is placed on the lead 76 and when the button 14 is released, the signal on the lead 76 becomes a logic level 0. The outputs from the illustrative system are the INCREMENT and DECREMENT outputs on the leads 66, 68, respectively, and are intended to trigger application specific circuitry of the display unit 10 with positive going edges.

The RESET signal on the lead 46 is a short pulse generated by providing a positive edge to the trigger input 78 of the one-shot timer circuit 80. The pulse duration of the RESET signal is only long enough to insure that the other system components are reset to their initial states. There are three input conditions that result in a RESET pulse on the lead 46, as decoded by the gate circuitry 82 connected to the input 78. Thus, the RESET pulse on the lead 46 is generated the instant neither of the buttons 12, 14 are pressed (i.e., upon release of the buttons 12, 14 after a previous indexing). The RESET pulse on the lead 46 is also generated if either the button 12 is released while the button 14 is pressed and the UP signal on the lead 60 is active, or if the button 14 is released while the button 12 is pressed and the DOWN signal on the lead 62 is active. The latter two conditions represent a reversal in the indexing direction.

The automatic indexing delay time τ is determined by a combination of the frequency of the clock circuit 84 and the N-bit value set into the delay decoder circuit 86. If the KEY signal on the lead 48 is active and the AUTO signal on the lead 52 is inactive, clock signals generated by the clock circuit 84 will pass through the AND gate 88 and cause the counter circuit 90 to count upwards from zero, feeding an N-bit count signal over the leads 92 to the delay decoder circuit 86. If the pressed one of the input buttons 12, 14 is held long enough, the output from the counter circuit 90 will reach the preset count set into the delay decoder circuit 86, causing the delay decoder circuit 86 to make its AUTO output on the lead 52 active. The AUTO signal on the lead 52 is inverted by the inverter 94 and fed back to an input of the AND gate 88 to block the clock signals from the clock 84, thereby freezing the counter circuit 90 until the next RESET pulse on the lead 46.

If the AUTO signal on the lead 52 is active, the counter circuit 96 will count up or down at a fixed speed determined by the clock circuit 98. If both the buttons 12, 14 are pressed, the output of the AND gate 100 will be active and the counter circuit 96 will count up, otherwise it will count down. The counter circuit 96 does not "wrap around", so if it is directed to count down, but is currently at zero, it will remain at zero. Likewise, if it reaches its maximum value, and is directed to continue counting up, it will remain at its maximum value. The M-bit count value of the counter circuit 96 on the leads 102 is provided as an input to the digital to analog converter circuit 104, which converts the counter value to a directly proportional analog voltage on the lead 106. The voltage on the lead 106 is an input to the voltage controlled oscillator circuit 108, which provides a clock output signal on the SPEED lead 56 at a rate which is directly proportional to the voltage on the lead 106. This output of the voltage controlled oscillator circuit 108 is the SPEED signal and it has a minimum frequency when the counter circuit 96 is at zero and a maximum frequency when the counter circuit 96 is at its maximum value. The minimum SPEED frequency corresponds to the minimum, fixed, initial indexing speed and the maximum SPEED frequency corresponds to the maximum indexing speed.

The flip-flop circuits 110, 112 are configured in their toggle modes with all of their J and K inputs connected to the active logic level. A RESET pulse on the lead 46 clears the flip-flops 110, 112 so that the complementary output of the flip-flop 112 on the lead 114 is active. This allows an active signal on the lead 74 to pass through the AND gate 116 to the clock input of the flip-flop circuit 110. Thus, if the button 12 is pressed, the flip-flop circuit 110 will activate the UP signal on the lead 60 and deactivate the DOWN signal on the lead 62 to indicate that indexing should occur in the incrementing direction. If, instead, the button 14 had been pressed first after a RESET signal on the lead 46, the complementary output on the lead 114 of the flip-flop 112 will deactivate, preventing a subsequent activation on the lead 74 due to pressing of the button 12 from activating the UP signal on the lead 60. In this case, the DOWN signal on the lead 62 would be active, indicating that indexing should occur in the decrementing direction.

After a RESET pulse on the lead 46, if the button 12 is pressed and the button 14 is not pressed, a positive edge will be applied to the INCREMENT lead 66. On the other hand, if the button 14 is pressed and the button 12 is not pressed, then a positive edge will be provided on the DECREMENT lead 68. The one-shot timer circuits 118, 120 function the same as the one-shot timer circuit 80, and serve to transmit single indexing pulses to the output leads 66, 68 when one of the buttons 12, 14 is pressed. If the AUTO signal on the lead 52 is active and the UP signal on the lead 60 is active, the INCREMENT signal on the lead 66 will follow the SPEED signal on the lead 56. If the AUTO signal on the lead 52 is active and the DOWN signal on the lead 62 is active, the DECREMENT signal on the lead 68 will follow the SPEED signal on the lead 56.

Accordingly, there has been disclosed an improved control system having a two-button user interface and which provides bidirectional multispeed indexing control of a display unit having an increment input and decrement input so as to be controllable to sequentially index through an ordered list of discrete elements. While an illustrative embodiment of the present invention has been disclosed herein, it is understood that various adaptations and modifications to the disclosed embodiment are possible. Thus, while a hardware implementation of the present invention has been disclosed, it will be apparent to one of skill in the art that the invention can also be implemented in a properly programmed computer wherein the display unit corresponds to a scrollable list displayed on the monitor of the computer. Further, the present invention has utility in other applications of indexing, such as, for example, in stepwise speed control of a motor. It is therefore intended that this invention be limited only by the scope of the appended claims.

What is claimed is:

1. A bidirectional multispeed indexing control system for a display unit which has an increment input and a decrement input so as to be controllable to sequentially index through an ordered list of discrete elements, the control system comprising:

a first operator actuatable switch;

a second operator actuatable switch; and a display control unit responsive to operator actuation of the first and second switches and effective to provide signals to the increment and decrement inputs of the display unit so as to control the display unit to index through the ordered list in a respective direction according to which of the first and second switches is actuated first and at a speed determined by whether the other of the first and second switches is also actuated.

2. The control system according to claim 1 wherein the display control unit is responsive to continued actuation of the other of the first and second switches to increase the indexing speed of the display unit.

3. The control system according to claim 2 wherein the display control unit is responsive to subsequent deactuation of the other of the first and second switches to decrease the indexing speed of the display unit.

4. The control system according to claim 1 wherein the display control unit is responsive to continued actuation of the other of the first and second switches to increase the indexing speed of the display unit up to a predetermined limit and to thereafter maintain the indexing speed of the display unit at that limit while both of the first and second switches are actuated.

5. The control system according to claim 1 wherein the display control unit includes:

a clock circuit providing a train of clock pulses;

a counter receiving said clock pulses and responsive to actuation of both said first and second switches to count said clock pulses and provide an output indicative of the count up to a predetermined limit;

a digital to analog converter receiving said counter output and effective to provide a voltage output corresponding to said counter output; and a voltage controlled oscillator receiving said voltage output and effective to provide a train of output pulses at a rate corresponding to said voltage output;

wherein said train of output pulses is utilized by the display control unit to generate increment and decrement signals for application to said display unit increment and decrement inputs.

6. The control system according to claim 1 wherein the display control unit includes:

a clock circuit providing a train of clock pulses;

a counter receiving said clock pulses and responsive to continuous actuation of at least one of said first and second switches to count said clock pulses and provide an output indicative of said count; and a decoder receiving said counter output and effective in response to said counter output reaching a predetermined value to generate an output signal;

wherein the display control unit responds to said output signal to provide a train of pulses used to generate increment and decrement signals for application to said display unit increment and decrement inputs.

7. The control system according to claim 1 wherein the display control unit includes:

a first clock circuit providing a train of first clock pulses;

a first counter receiving said first clock pulses and responsive to continuous actuation of at least one of said first and second switches to count said first clock pulses and provide a first count output indicative of the first clock pulse count;

a decoder receiving said first count output and effective in response to said first count output reaching a predetermined value to generate a decoder output signal;

a second clock circuit providing a train of second clock pulses;

a second counter receiving said second clock pulses and responsive to actuation of both said first and second switches and said decoder output signal to count said second clock pulses and provide a second count output indicative of the second clock count up to a predetermined maximum limit;

a digital to analog converter receiving said second count output and effective to provide a voltage output corresponding to said second count output; and a voltage controlled oscillator receiving said voltage output and effective to provide a train of output pulses at a rate equal to a predetermined minimum rate plus a rate corresponding to said voltage output;

wherein said train of output pulses is utilized by the display control unit to generate increment and decrement signals for application to said display unit increment and decrement inputs;

whereby when a single switch is continuously actuated the increment or decrement signals are generated at a fixed minimum rate and when both switches are continuously actuated the increment or decrement signals are generated at a rate which increases from the fixed minimum rate to a predetermined maximum rate.

8. The control system according to claim 7 wherein the second counter is arranged so that when the other of the first and second switches is no longer actuated after both switches had been actuated the second clock pulses are utilized to decrement the second count output.

9. A method for providing bidirectional multispeed indexing control for a display unit having increment and decrement inputs so as to be controllable to sequentially index through an ordered list of discrete elements in response to selective actuation of first and second operator actuatable devices, comprising the steps of:

responding to actuation of one of the devices for providing signals to a respective one of the increment and decrement inputs so as to control the display unit to index through the ordered list in a respective direction corresponding to which of the devices is actuated first; and controlling the indexing speed of the display unit in accordance with whether the other of the devices is also actuated.

10. The method according to claim 9 further comprising the step of:

increasing the indexing speed of the display unit in response to continued actuation of the other of the devices.

11. The method according to claim 10 further comprising the step of:

decreasing the indexing speed of the display unit in response to subsequent deactuation of the other of the devices.

12. The method according to claim 9 further comprising the steps of:

responding to continued actuation of the other of the devices for increasing the indexing speed of the display unit up to a predetermined limit; and maintaining the indexing speed of the display unit at the predetermined limit while both of the devices are actuated.

13. A bidirectional multispeed indexing control system operative to selectively provide output pulses on first and second output leads, the control system comprising:

a first operator actuatable switch;

a second operator actuatable switch; and a control unit responsive to operator actuation of the first and second switches and effective to provide output pulses on one of the first and second output leads according to which of the first and second switches is actuated first and at a pulse rate determined by whether the other of the first and second switches is also actuated.

14. A method for providing bidirectional multispeed indexing pulses on first and second output leads in response to selective actuation of first and second operator actuatable devices, comprising the steps of:

responding to actuation of one of the devices for providing pulses to a respective one of the output leads corresponding to which of the devices is actuated first; and controlling the pulse rate of the indexing pulses in accordance with whether the other of the devices is also actuated.

* * * * *